United States Patent Office 3,324,147
Patented June 6, 1967

3,324,147
SUBSTITUTED NORBORNENE HERBICIDES
Victor Mark, Ransomville, N.Y., assignor to Monsanto Company, St. Louis, Mo., a corporation of Delaware
No Drawing. Filed Apr. 5, 1965, Ser. No. 445,688
4 Claims. (Cl. 260—348)

This is a continuation-in-part of application Ser. No. 124,321, filed July 17, 1961, by Victor Mark, and now abandoned.

This invention relates to new herbicidal compounds and methods for their use in controlling undesired vegetation. More particularly, the invention is directed to new chemical compounds, methods of preparation and methods for their use in inhibiting the germination of seeds and the growth of weeds, and destroying grass-type vegetation. Of special significance is the selective control of grasses in the presence of growing crop plants.

Many chemical compounds are known to inhibit the growth of vegetation and some of these are known to have strong herbicidal effects over a broad spectra of plants. Some chemical compounds have herbicidal activity on unwanted and harmful plants in growing crops without injuring the desired plants. It is known that the metabolisms of the plants in any of the plant genera are similar and respond in similar manners to treatments with chemicals. Since many crop plants are within the same genera and other genera include only weed plants, selective herbicides are known which will control the growth of undesired plant species. For use in lawns, herbicides have been developed which will eliminate species from the broadleaf genera without affecting the grasses. Since many food crop plants are broadleaf type and are inhibited by known lawn herbicides, it has been necessary to develop different herbicides active on the weeds prevalent in food crop growing areas. Many of these weeds are grass-type plants. For the control of these, grass-specific herbicides have been quite successful; however, the cost of treatment has to some extent limited their use.

It is the primary purpose of this invention to develop new herbicides which are grass specific. It is also an object of this invention to provide a herbicide effective at very low levels of application. Another purpose of the invention is to provide useful herbicides which can easily be synthesized from abundantly available raw materials. Other objects of this invention are set forth hereinafter.

It has now been found that a family of derivatives of the hexahalocyclopentadienes have unusual activity as selective herbicides. The compounds have the structure:

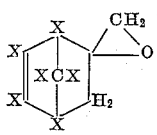

wherein X is a halogen of the group consisting of chlorine, bromine and fluorine.

These compounds may be prepared by the Diels-Alder adduction of a hexahalocyclopentadiene with an allyl halide followed by a dehydrohalogenation with base to form 1,2,3,4,7,7-hexahalo-5-methylene-2-norbornene:

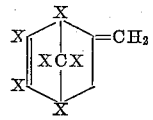

An alternative method of preparing the same intermediate compound is by the Diels-Alder adduction of a hexahalocyclopentadiene with allene (propadiene).

In the preparation of the new compounds, the 1,2,3,4,7,7-hexahalo-5-methylene-2-norbornene is oxidized to the corresponding epoxide. The epoxidation is effected by contacting said intermediate with a hydroperoxy compound, such as perbenzoic acid, peroxyacetic acid and peroxyphthalic acid; peroxides such as hydrogen peroxide and sodium peroxide in the presence of an acid, such as acetic acid, succinic acid, adipic acid and the mineral acids HCl, sulfuric or phosphoric acids may also be used; other peroxy compounds such as the peroxy esters, for example, isopropyl percarbonate, and other compounds which will release active oxygen under the conditions of reaction are also effective epoxidizing agents. The epoxidation reaction is preferably conducted by combining the reagents gradually so as to permit the maintenance of the desired temperature throughout the reaction. The new compounds so prepared may then be separated from the reaction mixture and purified by vacuum distillation or recrystallization.

Further details of the preparation of the new compounds are set forth in the following examples.

*Example 1*

To a solution of 31.3 g. (0.1 mole) of 1,2,3,4,7,7-hexachloro-5-methylene-2-norbornene there was added a solution of 7.6 g. (0.1 mole) of peracetic acid and anhydrous sodium acetate (2.01 g.) in 200 ml. of glacial acetic acid while maintaining the temperature of the reaction mixture between 20 and 30° C. When a potassium iodide test gave essentially negative results, indicating that all of the peracid disappeared, the colorless reaction mixture was poured onto ice, extracted with chloroform, washed with water, dried and the solvent evaporated. On cooling, the oily residue solidified to a crystalline mass, the weight of which (32.0 g.) indicated an essentially quantitative conversion. Recrystallization of a sample from aqueous methanol yielded white crystals, M.P. 91–3° C., the infrared spectrum of which indicated the complete absence of the starting material and the presence of 1,4,5,6,7,7-hexachlorospiro[5-norbornene-2,2′-oxirane]:

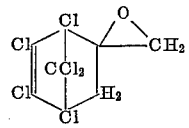

by the strong and characteristic maxima at 6.24, 8.00, 8.62, 9.18, 9.68, 10.41, 10.91, 11.83, 12.34, 14.33 and 14.80μ.

*Example 2*

The procedure of Example 1 was repeated exactly as described except that the stoichiometric amount (13.8 g.) of perbenzoic acid in form of a chloroform solution was used instead of the acetic acid solution of peracetic acid. Workup of the reaction mixture yielded 1,4,5,6,7,7-hexachlorospiro-[5-norbornene-2,2′-oxirane] in essentially quantitative yield.

*Example 3*

The procedure of Example 1 was repeated except substituting a mixture of an equivalent amount of hydrogen peroxide in acetic acid for peracetic acid as the epoxidizing agent and carrying out the reaction between 30 and 50° C. The product of the reaction was identified as 1,4,5,6,7,7-hexachlorospiro[5-norbornene-2,2′-oxirane] by its infrared spectrum.

*Example 4*

The procedure of Example 1 was repeated using the equivalent amount of 1,2,3,4-tetrachloro-7,7-difluoro-5-methylene-2-norbornene as the halogenated substrate. Oxidation with peracetic acid produced a compound identified as 1,4,5,6-tetrachloro-7,7-difluorospiro[5-norbornene-2,2′-oxirane], $C_8H_4Cl_4F_2O$.

Example 5

The procedure of Example 1 was repeated except for substituting 1,2,3,4,7,7-hexabromo-5-methylene-2-norbornene in equivalent amount for the chloroolefin. Workup of the reaction mixture yielded 1,4,5,6,7,7-hexabromospiro[5-norbornene-2,2'-oxirane].

The relative value of the new compounds as herbicides was measured in the greenhouse. Both pre-emergence and contact activity were noted. Greenhouse flats were planted with a large variety of seeds selected so as to provide several of at least one species of the genera which includes objectionable weed-type plants. The flats were planted by laying the seeds on the surface of the soil and spreading ⅜" of soil on top. The flats were then sprayed with solutions or suspensions in predetermined amounts calibrated in pounds per acre. Some weeds were permitted to emerge so as to provide information on normal germination. Contact activity was also measured on emerged seedlings.

The following seeds were used:

(A) Morning Glory
(B) Wild Oat
(C) Brome Grass
(D) Rye Grass
(E) Radish
(F) Sugar Beet
(G) Foxtail
(H) Crab Grass
(I) Pigweed
(J) Soybean
(K) Wild Buckwheat
(L) Tomato
(M) Sorghum In the following tables the herbicidal ratings are described according to the following code:

0—no phytotoxicity
1—slight phytotoxicity
2—moderate phytotoxicity
3—severe phytotoxicity To demonstrate the unusual pre-emergence activity of the hexahalospironorborneneoxirane, several related compounds were also synthesized and screened simultaneously:

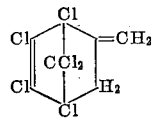 (I)
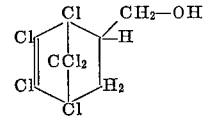 (II)
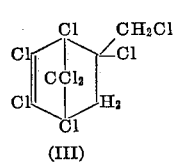 (III)
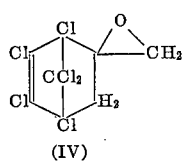 (IV)

| Compound | At 5 lbs. per acre | | | | | | | | | | | | |
|---|---|---|---|---|---|---|---|---|---|---|---|---|---|
| | A | B | C | D | E | F | G | H | I | J | K | L | M |
| I | 0 | 3 | 3 | 3 | 0 | 0 | 3 | 3 | 1 | 0 | 0 | 0 | 3 |
| II | 0 | 0 | 0 | 0 | 0 | 0 | 0 | 0 | 0 | 0 | 0 | 0 | 0 |
| III | 0 | 0 | 0 | 0 | 0 | 0 | 1 | 0 | 2 | 0 | 0 | 0 | 0 |
| IV | 0 | 3 | 3 | 3 | 0 | 0 | 3 | 3 | 3 | 0 | 0 | 0 | 3 |
| | At 1 lb. per acre | | | | | | | | | | | | |
| I | 0 | 0 | 1 | 0 | 0 | 0 | 0 | 1 | 0 | 0 | 0 | 0 | 2 |
| IV | 0 | 3 | 3 | 3 | 0 | 0 | 3 | 3 | 1 | 0 | 0 | 0 | 3 |
| | At 0.25 lb. per acre | | | | | | | | | | | | |
| I | 0 | 0 | 0 | 0 | 0 | 0 | 0 | 0 | 0 | 0 | 0 | 0 | 0 |
| IV | 0 | 0 | 0 | 3 | 0 | 0 | 2 | 2 | 0 | 0 | 0 | 0 | 1 |

The herbicidal effects are usually noticeable at very low levels of application, for example 0.25 lb. per acre where pronounced grass specificity is observed. The optimum level of application for control of most grasses is one to ten pounds per acre. In general, the higher applications produce a more universal herbicidal effect. For most compounds there is a progressively increasing activity as the level of application is increased. Occasionally, some broadleaf plants may be sensitive to a particular herbicide; however, all of the new compounds have useful herbicidal properties.

Selective herbicidal activity with respect to several genera of grasses is illustrated by the data in the above tables. Other experiments run with respect to plants of different genera, which have different metabolisms and physical characteristics indicate little or no inhibition of growth. The five botanical types, or genera, of grasses B, C, D, G and H embrace a large number of undesirable plants or weeds, frequently found in vegetable crops. This invention is not limited to removing grasses from broadleaf plants, since the selective activity will be useful in removing weeds from corn, which belongs to a different genus of grass. Many other crops, and particularly the broadleaved plants, are inhibited by weeds of the grass genera, which can be effectively controlled by the practice of this invention. In some instances there are minor herbicidal effects on dicotyledonous plants, and therefore optimum results may depend to some extent on experience with respect to the activity of the particular derivative on the vegetable crop to be treated.

It will be apparent that quite different effects can be obtained by modifying the method of use. For this reason, an essential part of this invention is the formulation so as to permit a uniform predetermined application of herbicide to the plant environment, for example to the soil surfaces, so as to produce the desired effect. By the proper selection and proportioning of the various conditioning agents, either liquid or solid formulations can be prepared and so as to adapt the herbicide for achieving the desired result with any conventional device for treating plant or soil surfaces.

The solid formulations, frequently referred to as "dusts" or "granules," may contain in addition to the active ingredient, diluents or extenders, dispersing agents to prevent local high concentrations, and agents to facilitate distribution in soils or soil waters. Suitable solid diluents are those which render the compositions permanently dry and free flowing. Thus, hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, Fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight of the entire formulation as applied to the soil. More concentrated herbicides will require dilution by the user in order to properly condition the soil for the most effective herbicidal activity. The concentrated solid herbicidal formulation can be used with less danger if it is mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. The herbicides may be water-soluble and mere dissolution will then provide a usable formulation. Often the herbicidal compounds are only limitedly soluble in water and therefore aqueous formulations will necessarily be dispersions of minute drops of the water-insoluble substances in suspension in an aqueous medium. The known water-insoluble substituted products of this invention may first be dissolved in a suitable organic solvent and the organic solution of the active ingredient then incorporated in water or in any aqueous medium to produce a heterogeneous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and include conventional soaps, such as the water-soluble salts of long chain carboxylic acids, the amine soaps such as the amine salts of long chain carboxylic acids, the sulfonated animal, vegetable and mineral oils, quaternary salts of high molecular weight acids, resin soaps such as salts of abietic acid, sulfuric acid salts of high molecular weight organic compounds, algin soaps, ethylene oxide condensated with fatty acid, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as one percent or as much as 20 percent to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either liquid or solid in physical state. Thus, a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed-destroying properties. The described "conditioning agents" enable the proper use to achieve the desired herbicidal effects by an unskilled operator without elaborate equipment.

In addition to the above described herbicide conditioning agents, other adjuvants may be added, such as insecticides, fungicides, nematocides and other herbicides. By the use of the subject compounds at the low grass-specific levels of application, substantial benefits can be obtained by the addition thereto of a broadleaf specific herbicide. In this manner, formulations of efficient and effective use can be provided.

Although the invention is described with respect to specific modifications, it is not intended that the details thereof shall be limitations on the scope of the invention except to the extent incorporated in the following claims.

What is claimed is:
1. A compound of the structure

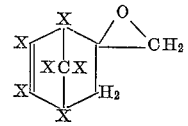

wherein X is a halogen selected from chlorine, bromine and fluorine.

2. 1,4,5,6,7,7 - hexachlorospiro[5 - norbornene - 2,2'-oxirane].

3. 1,4,5,6 - tetrachloro-7,7-difluorospiro[5-norbornene-2,2'-oxirane].

4. 1,4,5,6,7,7 - hexabromospiro[5 - norbornene - 2,2'-oxirane].

No references cited.

WALTER A. MODANCE, *Primary Examiner.*

NORMA S. MILESTONE, *Assistant Examiner.*